United States Patent
Hu

(10) Patent No.: US 11,252,444 B2
(45) Date of Patent: Feb. 15, 2022

(54) VIDEO STREAM PROCESSING METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventor: Xiaohua Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/903,350

(22) Filed: Jun. 16, 2020

(65) Prior Publication Data

US 2020/0314460 A1 Oct. 1, 2020

Related U.S. Application Data

(63) Continuation of application No. PCT/CN2019/079799, filed on Mar. 27, 2019.

(30) Foreign Application Priority Data

Apr. 24, 2018 (CN) .......................... 201810371700.X

(51) Int. Cl.
*H04N 21/233* (2011.01)
*G10L 13/08* (2013.01)
(Continued)

(52) U.S. Cl.
CPC ......... *H04N 21/2335* (2013.01); *G10L 13/08* (2013.01); *G10L 15/26* (2013.01);
(Continued)

(58) Field of Classification Search
None
See application file for complete search history.

(56) References Cited

U.S. PATENT DOCUMENTS

2006/0285654 A1 12/2006 Nesvadba et al.
2017/0006331 A1 1/2017 Jairath et al.
(Continued)

FOREIGN PATENT DOCUMENTS

CN 1774715 A 5/2006
CN 103226947 A 7/2013
(Continued)

OTHER PUBLICATIONS

The World Intellectual Property Organization (WIPO) International Search Report for PCT/CN2019/079799 dated Jun. 18, 2019 5 Pages (including translation).
(Continued)

*Primary Examiner* — Omar S Parra
(74) *Attorney, Agent, or Firm* — Anova Law Group, PLLC

(57) ABSTRACT

A video stream processing method includes: obtaining first audio stream data included in live video stream data; performing speech recognition on the first audio stream data, to obtain a speech recognition text; and generating second audio stream data according to the speech recognition text. The second audio stream data includes a second speech, and a language of the second speech being different from a language of the first speech. The method also includes merging the second audio stream data and the live video stream data according to time information, to obtain processed live video stream data. The time information indicates a playing timestamp of the second audio stream data and the live video stream data.

19 Claims, 11 Drawing Sheets

(51) Int. Cl.
    *G10L 15/26*     (2006.01)
    *H04N 21/2187*     (2011.01)
    *H04N 21/234*     (2011.01)
    *H04N 21/239*     (2011.01)
    *H04N 21/43*     (2011.01)

(52) U.S. Cl.
    CPC ....... *H04N 21/2187* (2013.01); *H04N 21/234* (2013.01); *H04N 21/2393* (2013.01); *H04N 21/4307* (2013.01)

(56) References Cited

U.S. PATENT DOCUMENTS

| | | | |
|---|---|---|---|
| 2017/0325003 A1 | 11/2017 | Hackett et al. | |
| 2020/0058289 A1* | 2/2020 | Gabryjelski | G10L 17/00 |
| 2021/0076107 A1* | 3/2021 | Quek | H04N 21/8547 |

FOREIGN PATENT DOCUMENTS

| | | |
|---|---|---|
| CN | 103491429 A | 1/2014 |
| CN | 104427294 A | 3/2015 |
| CN | 105704538 A | 6/2016 |
| CN | 205647778 U | 10/2016 |
| CN | 106340294 A | 1/2017 |
| CN | 108566558 A | 9/2018 |

OTHER PUBLICATIONS

The State Intellectual Property Office of the People's Republic of China (SIPO) Office Action 1 for for 201810371700.X dated Mar. 19, 2021 12 Pages (including translation).

\* cited by examiner

VIDEO STREAM PROCESSING METHOD, COMPUTER DEVICE, AND STORAGE MEDIUM

CROSS REFERENCES TO RELATED APPLICATIONS

This application is a continuation application of PCT Patent Application No. PCT/CN2019/079799, filed on Mar. 27, 2019, which claims priority to Chinese Patent Application No. 201810371700.X, entitled "VIDEO STREAM PROCESSING METHOD AND APPARATUS, COMPUTER DEVICE, AND STORAGE MEDIUM" filed with the National Intellectual Property Administration, PRC on Apr. 24, 2018, the entire contents of both of which are incorporated herein by reference.

FIELD OF THE TECHNOLOGY

The present disclosure relates to the field of Internet application technologies, and in particular, to a video stream processing method and apparatus, a computer device, and a storage medium.

BACKGROUND OF THE DISCLOSURE

With the continuous development of the mobile Internet, video on-live applications become increasingly popular, and adding a translation speech to a live video has also become an important means to improve viewing experience of a user.

In the related art, a translation speech in a live video is usually implemented on a live recording end (for example, a recording site/studio) based on a human interpreter's simultaneous interpretation. For example, in a process of acquiring and encoding video images on a live recording end, an audio signal on site is transferred to an interpretation room through a mixer. An interpreter receives the audio signal on site through a headset, and then interprets heard content to a microphone. The microphone transmits an acquired interpretation speech to the live recording end, and the live recording end transmits interpretation speech data together with video data acquired on site to an acquisition and encoding service. The acquisition and encoding service encodes the interpretation speech data and the video data into a live stream, and accesses the live stream to a live streaming platform.

However, in the above described strategy, synchronization accuracy between the interpretation speech data and the image frames of the live video data is low, and long delays in live broadcast often occur, affecting the live streaming effect.

SUMMARY

Embodiments of the present disclosure provide a video stream processing method, a computer device, and a storage medium. The technical solutions are as follows:

According to an aspect, a video stream processing method is provided, performed by a computer device, the method including: obtaining first audio stream data included in live video stream data; performing speech recognition on the first audio stream data, to obtain a speech recognition text; and generating second audio stream data according to the speech recognition text. The second audio stream data includes a second speech, and a language of the second speech being different from a language of the first speech. The method also includes merging the second audio stream data and the live video stream data according to time information, to obtain processed live video stream data. The time information indicates a playing timestamp of the second audio stream data and the live video stream data.

According to another aspect, a computer device is provided, including a processor and a memory coupled to the processor. The processor is configured to perform: obtaining first audio stream data included in live video stream data; performing speech recognition on the first audio stream data, to obtain a speech recognition text; and generating second audio stream data according to the speech recognition text. The second audio stream data includes a second speech, and a language of the second speech being different from a language of the first speech. The processor is also configured to perform merging the second audio stream data and the live video stream data according to time information, to obtain processed live video stream data. The time information indicates a playing timestamp of the second audio stream data and the live video stream data.

According to yet another aspect, a non-transitory computer-readable storage medium is provided, storing at least one instruction, at least one program, and a code set or an instruction set, the at least one instruction, the at least one program, and the code set or the instruction set being loaded and executed by a processor to implement obtaining first audio stream data included in live video stream data; performing speech recognition on the first audio stream data, to obtain a speech recognition text; and generating second audio stream data according to the speech recognition text. The second audio stream data includes a second speech, and a language of the second speech being different from a language of the first speech. The at least one instruction, the at least one program, and the code set or the instruction set also cause the processor to perform merging the second audio stream data and the live video stream data according to time information, to obtain processed live video stream data. The time information indicates a playing timestamp of the second audio stream data and the live video stream data.

It is to be understood that the above general descriptions and the following detailed descriptions are merely for exemplary and explanatory purposes, and cannot limit the present disclosure.

BRIEF DESCRIPTION OF THE DRAWINGS

The accompanying drawings, which are incorporated herein and constitute a part of this specification, illustrate embodiments consistent with the present disclosure and, together with this specification, serve to explain the principles of the present disclosure.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

Before the embodiments shown in the present disclosure are described, several concepts involved in the present disclosure are first introduced:

(1) Subtitle

The subtitle refers to non-image content such as dialogs or narrations displayed in a form of text in online videos, TV, movies, and stage works. It also refers to a post-processing text of film and television works.

(2) Live Streaming

The live streaming is a set of technology that displays vivid and intuitive real scenes of rich elements such as images, sounds and texts to users via the Internet by using a streaming media technology, which relates to a series of service modules such as an encoding tool, streaming media data, a server, a network, and a player.

(3) Real-Time Translation

The real-time translation refers to instantly translating a speech or a text of a language type into a speech or a text of another language type manually or by using a computer. In the embodiments of the present disclosure, the real-time translation may be speech recognition and instant translation based on artificial intelligence.

Figure 1:
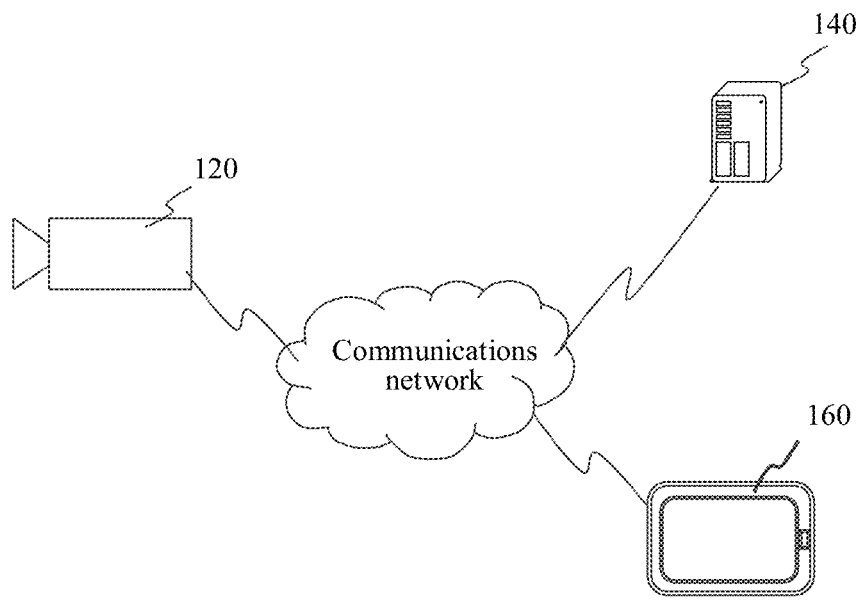
FIG. 1 is a schematic structural diagram of a live streaming system according to an embodiment of the present disclosure.

FIG. 1 is a schematic structural diagram of a live streaming system according to an embodiment of the present disclosure. The system includes a live recording terminal 120, a server 140, and several user terminals 160.

The live recording terminal 120 may be a mobile phone, a tablet computer, an e-book reader, smart glasses, a smart watch, a Moving Picture Experts Group Audio Layer III (MP3) player, a Moving Picture Experts Group Audio Layer IV (MP4) player, a laptop portable computer, a desktop computer, or the like.

The live recording terminal 120 corresponds to an image acquisition component and an audio acquisition component. The image acquisition component and the audio acquisition component may be a part of the live recording terminal 120. For example, the image acquisition component and the audio acquisition component may be a built-in camera and a built-in microphone of the live recording terminal 120. Alternatively, the image acquisition component and the audio acquisition component may be connected to the live recording terminal 120 as peripheral devices of the live recording terminal 120. For example, the image acquisition component and the audio acquisition component may be respectively a camera and a microphone connected to the live recording terminal 120. Alternatively, the image acquisition component and the audio acquisition component may be partly built into the live recording terminal 120, and partly serve as peripheral devices of the live recording terminal 120. For example, the image acquisition component may be a built-in camera of the live recording terminal 120, and the audio acquisition component may be a microphone in a headset connected to the live recording terminal 120. Implementation forms of the image acquisition component and the audio acquisition component are not limited in this embodiment of the present disclosure.

The user terminal 160 may be a terminal device having a video playing function. For example, the user terminal may be a mobile phone, a tablet computer, an e-book reader, smart glasses, a smart watch, an MP3/MP4 player, a laptop portable computer, a desktop computer, or the like.

The live recording terminal 120 and the user terminal 160 are respectively connected to the server 140 through a communications network. The communications network may be a wired network or a wireless network.

In some embodiments of the present disclosure, the live recording terminal 120 may upload a locally recorded live video stream to the server 140, and the server 140 performs related processing on the live video stream and then pushes the processed live video stream to the user terminal 160.

The server 140 may be one server or several servers, a virtualization platform, or a cloud computing service center.

A live streaming application (APP) client (for example, Tencent video client or Huayang live client) may be installed in the live recording terminal 120, and the server 140 may be a live streaming server corresponding to the live streaming application.

During live streaming, the live recording terminal runs the live streaming application client. After a user A (also referred to as an anchor) triggers a live streaming function in a live streaming application interface, the live streaming application client invokes the image acquisition component and the audio acquisition component in the live recording terminal to record the live video stream, and uploads the recorded live video stream to the live streaming server. The live streaming server receives the live video stream, and establishes a live channel for the live video stream. A process of establishing the live channel includes, for example, allocating a live channel name to the live video stream, different live video streams having different live channel names; associating the live channel name with a user identifier (for example, an identifier such as a user name of the user A in the live streaming application) of a user uploading the live video stream; allocating a storage space occupied by the live channel; and generating a link address of the live channel on the server. The user corresponding to the user terminal may access the live streaming server by using the live streaming application client or a browser client installed in the user terminal. After the live channel is selected on an access page, the live streaming server pushes the live video stream to the user terminal, and the user terminal plays the live video stream in the live streaming application interface or a browser interface.

The system may further include a management device (not shown in FIG. 1). The management device is connected to the server 140 through a communications network. The communications network may be a wired network or a wireless network.

According to some embodiments of the present disclosure, the wireless network or the wired network may use a standard communications technology and/or protocol. The network is generally the Internet, but may also be any other network, including but not limited to a local area network (LAN), a metropolitan area network (MAN), a wide area network (WAN), a mobile, wired, or wireless network, or any combination of a dedicated network or a virtual dedicated network). In some embodiments, technologies and/or formats such as Hypertext Markup Language (HTML) and Extensible Markup Language (XML) are used to represent data exchanged through a network. In addition, conventional encryption technologies such as Secure Socket Layer (SSL), Transport Layer Security (TLS), Virtual Private Network (VPN), and Internet Protocol Security (IPsec) may be used to encrypt all or some links. In other embodiments, custom and/or dedicated data communication technologies may also be used in place of or in addition to the foregoing data communication technologies.

Figure 2:
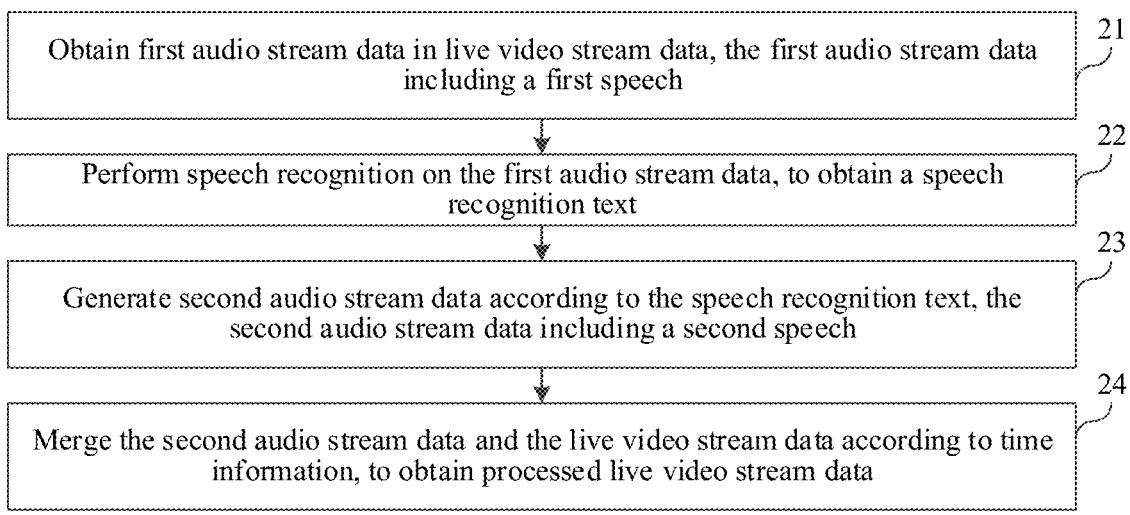
FIG. 2 is a flowchart of a video stream processing method according to an embodiment of the present disclosure.

FIG. 2 is a flowchart of a video stream processing method according to an embodiment of the present disclosure. The video stream processing method may be applied to the live streaming system shown in FIG. 1. As shown in FIG. 2, the video stream processing method in the live streaming scenario may include the following steps:

Step 21: Obtain first audio stream data in live video stream data, the first audio stream data including a first speech.

Audio stream data may be streaming data including audio frames in a live video stream.

Step 22: Perform speech recognition on the first audio stream data, to obtain a speech recognition text.

In some embodiments of the present disclosure, speech recognition refers to recognizing a speech in the first audio stream data as a text of a corresponding language type.

Step 23: Generate second audio stream data according to the speech recognition text, the second audio stream data including a second speech.

A language type corresponding to the second speech is different from a language type corresponding to the first speech.

Step 24: Merge the second audio stream data and the live video stream data according to time information, to obtain processed live video stream data.

The time information is used for indicating a playing timestamp of audio stream data or live video stream data.

As shown in step 21 to step 23, the step of obtaining first audio stream data, performing speech recognition, and generating second audio stream data according to a speech recognition result inevitably needs to consume some processing time. Therefore, in some embodiments of the present disclosure, the second audio stream data and the live video stream data may be merged according to the time information after a preset duration is delayed from a first moment, to obtain the processed live video stream data (that is, step 24). The first moment is a moment at which the live video stream data is obtained.

In some embodiments of the present disclosure, a fixed delay duration (that is, the preset duration, such as 5 minutes) may be preset. Timing is started when the live video stream data is obtained. On one hand, the live video stream data is cached; on the other hand, step 21 to step 23 start to be performed, and the second audio stream data generated in step 23 is cached. When the timing reaches the delay duration, the cached live video stream data and second audio stream data are extracted, and step 24 is performed according to the extracted live video stream data and second audio stream data.

The preset duration may be preset in a code by a developer, or the preset duration may be set or modified by a system administrator or a user. The preset duration may be greater than a duration required for performing step 21 to step 23.

In another possible implementation, step 24 may alternatively be performed directly after the second audio stream data is successfully stored.

In some embodiments of the present disclosure, for a piece of live video stream data, for example, after the server obtains the live video stream data, on one hand, the live video stream data is cached; on the other hand, step 21 to step 23 start to be performed. After the second audio stream data is successfully stored, the live video stream data corresponding to the second audio stream data may be extracted from the cache, and step 24 is performed according to the generated second audio stream data and the live video stream data extracted from the cache.

For example, the server may provide a live streaming simultaneous interpretation service, a speech storage service, and a simultaneous interpretation merge service. The live streaming simultaneous interpretation service is used for generating the second audio stream data according to the speech recognition text, the speech storage service is used for receiving and storing the second audio stream data generated by the live streaming simultaneous interpretation service, and the simultaneous interpretation merge service is used for merging the second audio stream data stored by the speech storage service and the live video stream data. In some embodiments of the present disclosure, when the simultaneous interpretation merge service receives a notification transmitted by the speech storage service that the second audio stream data is successfully stored, or when the simultaneous interpretation merge service finds through query that the second audio stream data stored by the speech storage service already exists in the database, the simultaneous interpretation merge service may determine that the speech storage service successfully stores the second audio stream data. In this case, the simultaneous interpretation merge service may start to perform step 24.

In this specification, the live streaming simultaneous interpretation service, the speech storage service, and the simultaneous interpretation merge service may respectively refer to a live streaming simultaneous interpretation service or a hardware and/or software module that provides a live streaming simultaneous interpretation service, a speech storage service or a hardware and/or software module that provides a speech storage service, and a simultaneous interpretation merge service or a hardware and/or software module that provides a simultaneous interpretation merge service.

By using the solution shown in FIG. 2, in a live streaming scenario, first audio stream data included in live video stream data may be obtained, speech recognition is performed on the first audio stream data, second audio stream data including a speech of a different language type is generated according to a recognition result, and then the second audio stream data and the live video stream data are merged according to time information to obtain processed live video stream data, thereby implementing accurate synchronization of a translation speech and a video picture. In addition, because there is no need for an interpreter to perform interpretation at a live streaming site, a live streaming delay can be effectively reduced.

The solution shown in FIG. 2 may be implemented by different devices in the live streaming system. For example, in a possible implementation, the video stream processing method may be performed by the server in the live streaming system. That is, after receiving the live video stream uploaded by the live recording terminal, the server obtains the live video stream data, and performs the processing shown in FIG. 2 on the obtained live video stream data.

Alternatively, in another possible implementation, the video stream processing method may also be performed by the live recording terminal in the live streaming system. That is, before uploading the live video stream data to the server, the live recording terminal obtains the live video stream data, and performs the processing shown in FIG. 2 on the obtained live video stream data.

Alternatively, in still another possible implementation, the video stream processing method may also be performed by the user terminal in the live streaming system. That is, after receiving the live video stream data pushed by the server and before playing the live video stream data, the user terminal performs the processing shown in FIG. 2 on the live video stream data.

In the subsequent embodiments of the present disclosure, descriptions are provided by using an example in which the video stream processing method is performed by the server in the live streaming system.

In a possible implementation, before performing step 24 in the embodiment shown in FIG. 2, the server further allocates the second audio stream data to a target soundtrack. The target soundtrack is different from a soundtrack in which the first audio stream data is located. For example, the server may add a soundtrack as the target soundtrack. That is, the server may merge the second audio stream data including a speech of a different language type into the live video stream data by using a soundtrack different from the soundtrack of the original audio stream (that is, the first audio stream data), so that when the user terminal subsequently plays the live video stream, the speech of the different language type can be played simultaneously with the original speech of the live video. The server may add, to the live video stream, the second audio stream data including only a translation speech of a single language type by using other soundtracks than the soundtrack in which the first audio stream data is located. Alternatively, the server may add, to the live video stream, the second audio stream data including translation speeches of a plurality of language types by using other soundtracks than the soundtrack in which the first audio stream data is located.

Figure 3:
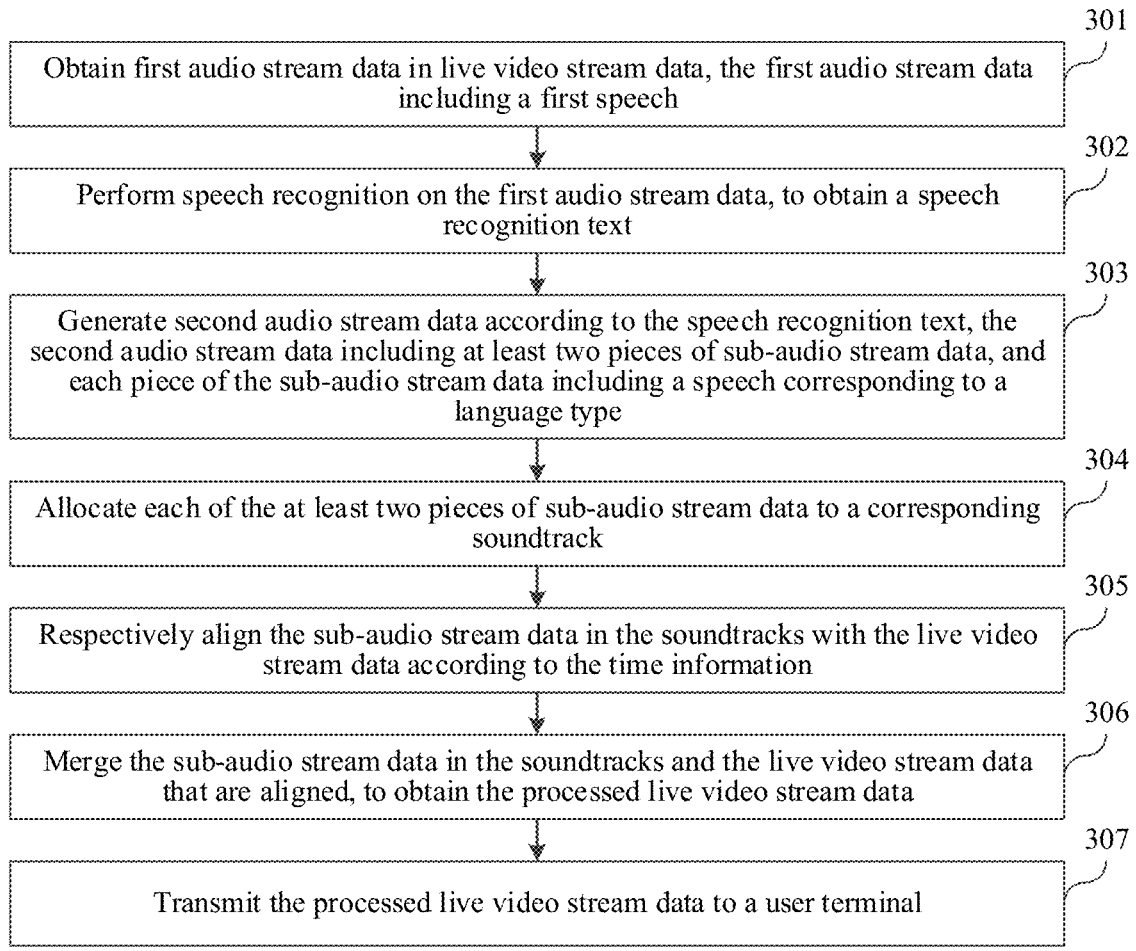
FIG. 3 is a flowchart of a video stream processing method according to another embodiment of the present disclosure.

FIG. 3 is a flowchart of a video stream processing method according to another embodiment of the present disclosure. The video stream processing method may be applied to a server, for example, the method may be applied to the server 140 shown in FIG. 1. Using an example in which the second audio stream data including translation speeches of a plurality of language types is added to the live video stream, as shown in FIG. 3, the video stream processing method may include the following steps:

Step 301: Obtain first audio stream data in live video stream data, the first audio stream data including a first speech.

Using an example in which the execution body is a server, a live recording terminal records a live video at a live streaming site, encodes the recorded video into a live video stream (also referred to as an original video stream), and pushes the live video stream to the server. After receiving the live video stream pushed by the live recording terminal, the server first transcodes the received live video stream, to obtain the live video stream data and the first audio stream data. Transcoding refers to converting a video stream on which compression encoding has been performed to another video stream, to adapt to different network bandwidths, different terminal processing capabilities, and different user requirements, and is essentially a process of first decoding and then encoding.

Figure 4:
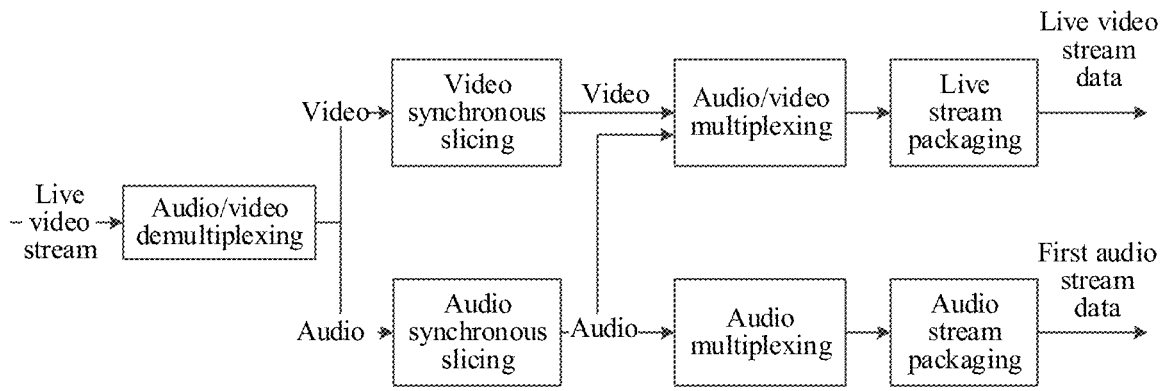
FIG. 4 is a schematic flowchart of live video stream transcoding according to the embodiment shown in FIG. 3.

For example, FIG. 4 is a schematic flowchart of live video stream transcoding according to some embodiments of the present disclosure. As shown in FIG. 4, after receiving a live video stream, the server performs audio/video demultiplexing, to obtain an audio stream and a picture frame stream (that is, "video" shown in FIG. 4). The server performs synchronous slicing on the audio stream and the picture frame stream, to synchronously obtain audio stream data and corresponding picture frame stream data. After the synchronous slicing, the audio stream is split into two parts. On one hand, the server performs audio/video multiplexing on one audio stream and the picture frame stream obtained after the slicing, and performs live stream packaging, to obtain the live video stream data; on the other hand, the server performs audio multiplexing on the other audio stream obtained after the slicing, and performs audio stream packaging, to obtain the first audio stream data.

In some embodiments of the present disclosure, the live video stream data obtained after the packaging is formed by a series of video stream data blocks, and the first audio stream data obtained after the packaging is formed by a series of audio stream data blocks.

The video stream data blocks in the live video stream data obtained after the packaging and the audio stream data blocks in the first audio stream data obtained after the packaging are in a one-to-one correspondence in time. That is, a playing timestamp of one video stream data block is completely the same as a playing timestamp of one corresponding audio stream data block. For example, the video stream data block and the audio stream data block each include respective time information, and a correspondence between the video stream data block and the audio stream data block is indicated by using respective time information. That is, for a video stream data block and an audio stream data block that are in a one-to-one correspondence, time information included in the two is also the same.

Figure 5:
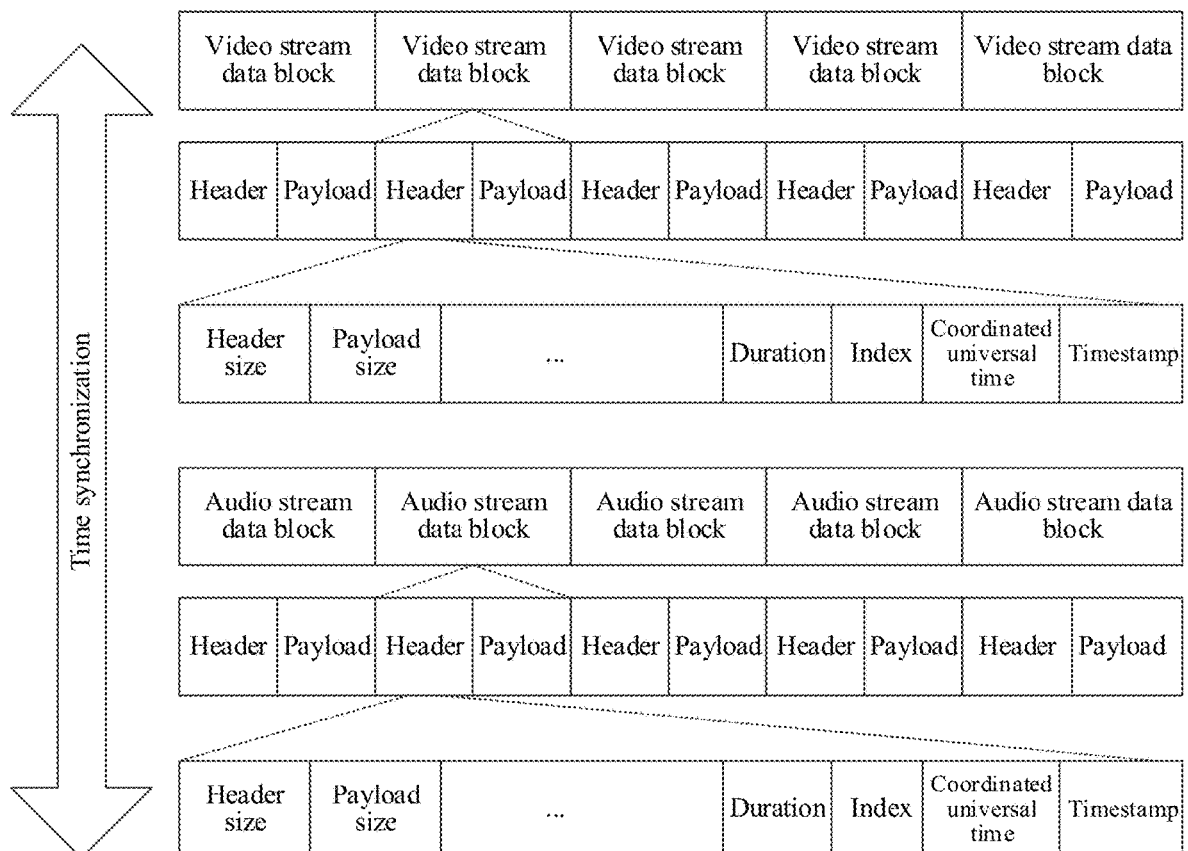
FIG. 5 is a data structure diagram of live video stream data according to the embodiment shown in FIG. 3.

For example, FIG. 5 is a data structure diagram of live video stream data according to some embodiments of the present disclosure.

As shown in FIG. 5, a video stream data block in the live video stream data includes two parts: a header and a payload. The payload includes picture frames and audio data in the video stream data block. The header includes information such as a header size, a payload size, a duration, an index, coordinated universal time (UTC), and a timestamp. The header size is used for indicating a data volume occupied by the header in the current video stream data block.

The payload size is used for indicating a data volume occupied by the payload in the current video stream data block. The duration is used for indicating a playing duration of picture frames and audio data in the current video stream data block, that is, a playing duration of the current video stream data block. The index is used for indicating a sequence of the current video stream data block in the video stream and/or identifying the current video stream data block. The coordinated universal time is used for indicating system time when the current video stream data block is transcoded (for example, system time when the first picture frame in the video stream data block is transcoded). The timestamp is used for indicating a time position of the current video stream data block in the live video stream.

Correspondingly, in FIG. 5, an audio stream data block in the first audio stream data also includes two parts: a header and a payload. The payload may include audio frames (or referred to as audio data) in the audio stream data block. The header includes information such as a header size, a payload size, a duration, an index, coordinated universal time, and a timestamp. The header size is used for indicating a data volume occupied by the header in the current audio stream data block. The payload size is used for indicating a data volume occupied by the payload in the current audio stream data block. The duration is used for indicating a playing duration of audio data in the current audio stream data block, that is, a playing duration of the current audio stream data block. The index is used for indicating a sequence of the current audio stream data block in the first audio stream and/or identifying the current audio stream data block. The coordinated universal time is used for indicating system time when the current audio stream data block is transcoded (for example, system time when the first audio frame in the audio stream data block is transcoded). The timestamp is used for indicating a time position of the current audio stream data block in the audio stream.

In the live video stream data and the first audio stream data shown in FIG. 5, respective time information of the video stream data block and the audio stream data block may be represented by the coordinated universal time and/or the timestamps in respective headers. That is, for a pair of video stream data block and audio stream data block synchronized in time, coordinated universal time and timestamps in the headers of the two are also the same.

In some embodiments of the present disclosure, when obtaining the live video stream data through transcoding, the server obtains the first audio stream data included in the live video stream data, and caches the live video stream data locally.

Step 302: Perform speech recognition on the first audio stream data, to obtain a speech recognition text.

A piece of audio stream data may include a plurality of speeches. To improve accuracy of speech recognition, in some embodiments of the present disclosure, when performing speech recognition on the first speech in the first audio stream data, the server may extract audio frames corresponding to the speeches from the first audio stream data, and separately perform speech recognition on the audio frames corresponding to the speeches.

For example, the server may perform speech start and end detection on the first audio stream data, to obtain a speech start frame and a speech end frame in the first audio stream data. The speech start frame is an audio frame at which a speech starts, and the speech end frame is an audio frame at which a speech ends. The server extracts at least one piece of speech data from the first audio stream data according to the speech start frame and the speech end frame in the first audio stream data, the speech data including audio frames between a corresponding pair of speech start frame and speech end frame. Then, the server perform speech recognition on each of the at least one piece of speech data, to obtain a recognition sub-text corresponding to each of the at least one piece of speech data. Finally, the server obtains the recognition sub-text corresponding to each of the at least one piece of speech data as the speech recognition text. The foregoing one speech may be a speech segment including one or more sentences. The speech recognition text data may include time information corresponding to the speech, for example, coordinated universal time and a timestamp of a start frame of the speech.

Figure 6:
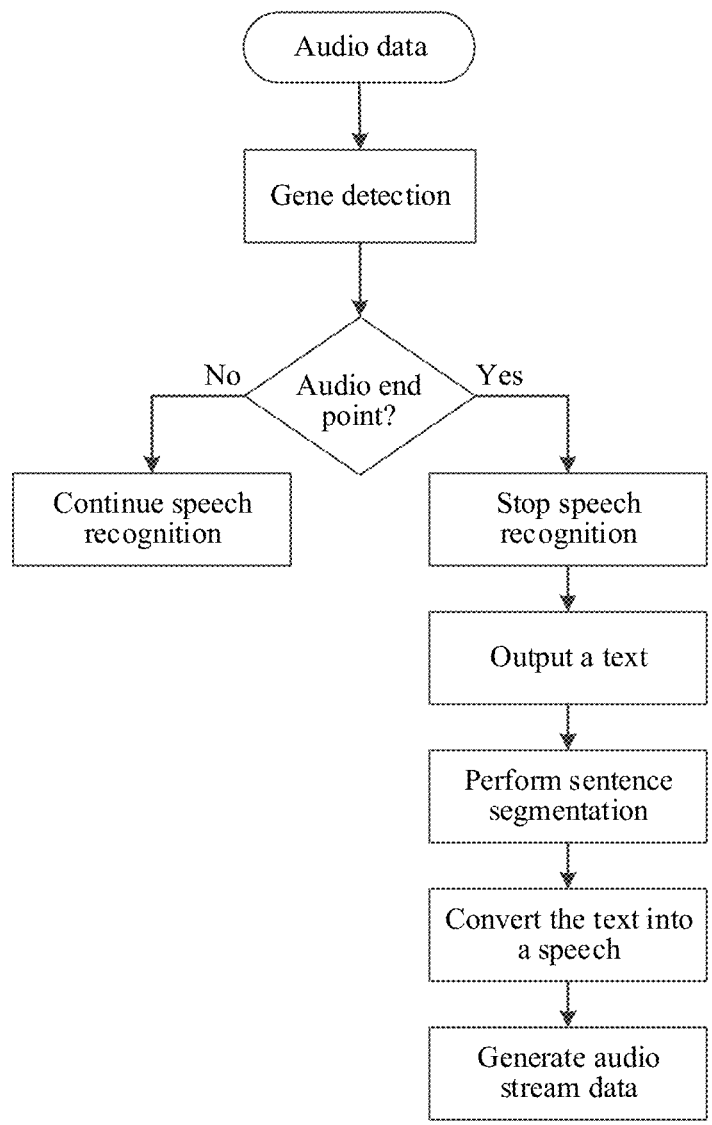
FIG. 6 is a flowchart of speech recognition according to the embodiment shown in FIG. 3.

The server may implement speech start and end detection through gene detection. For example, FIG. 6 is a flowchart of speech recognition according to some embodiments of the present disclosure. As shown in FIG. 6, after recognizing a speech start frame in the audio data (that is, the first audio stream data), the server starts to perform gene detection on audio frames after the speech start frame, to determine whether a currently detected audio frame corresponds to an audio end point (equivalent to the speech end frame). At the same time, the server inputs the detected audio frames into a speech recognition model for speech recognition. When the audio end point is detected, the server stops speech recognition and outputs a recognized text. After sentence segmentation, a subsequent process of generating second audio stream data is performed.

Step 303: Generate second audio stream data according to the speech recognition text, the second audio stream data including at least two pieces of sub-audio stream data, and each piece of the sub-audio stream data including a speech corresponding to a language type.

The second audio stream data includes a second speech, and a language type corresponding to the second speech is different from a language type corresponding to the first speech.

In some embodiments of the present disclosure, the server may translate the speech recognition text obtained in the foregoing step to a translation text corresponding to the language type corresponding to the second speech, and generate the second speech according to the translation text. Then the server generates the second audio stream data including the second speech.

In some embodiments of the present disclosure, the language type corresponding to the second speech may include at least two language types. Correspondingly, the server may separately generate a corresponding speech for each language type. For example, if the language type corresponding to the speech recognition text obtained through speech recognition is Chinese, and the language type corresponding to the second speech includes English, Russian, Korean, and Japanese, the server may generate four speeches for the speech recognition text, that is, an English speech, a Russian speech, a Korean speech, and a Japanese speech.

When the language type corresponding to the second speech includes at least two language types, the server may generate at least two pieces of sub-audio stream data when generating the second audio stream data, each piece of sub-audio stream data including a speech corresponding to a language type. Using an example in which the language type corresponding to the second speech includes English, Russian, Korean, and Japanese, the server may generate four pieces of sub-audio stream data, which are respectively sub-audio stream data including an English speech, sub-audio stream data including a Russian speech, sub-audio stream data including a Korean speech, and sub-audio stream data including a Japanese speech.

In some embodiments of the present disclosure, the second speech may further include corresponding time information. For example, speech data corresponding to each language type in the second speech may include several pieces of speech sub-data, and each piece of speech sub-data corresponds to a complete speech.

Figure 7A:
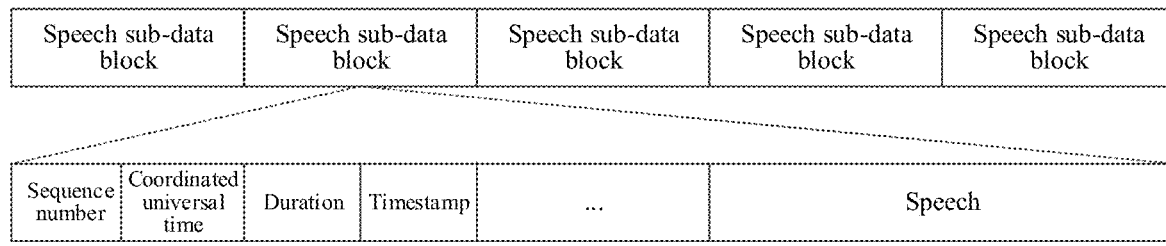
FIG. 7A is a schematic diagram of a data structure of sub-audio stream data according to the embodiment shown in FIG. 3.

According to some embodiments of the present disclosure, the sub-audio stream data may include several speech sub-data blocks. FIG. 7A is a schematic diagram of a data structure of sub-audio stream data according to some embodiments of the present disclosure. As shown in FIG. 7A, each speech sub-data block includes information such as a sequence number (seq), coordinated universal time, a duration, a timestamp, and a speech. The duration of the speech sub-data block may be a lasting duration or a playing duration of the speech sub-data block. The coordinated universal time of the speech sub-data block may be start and end time points (that is, coordinated universal time when the first audio frame of the complete speech for recognition is transcoded) of a corresponding complete speech for recognition (that is, a corresponding first speech). The timestamp of the speech sub-data block may be a timestamp of the first audio frame of the corresponding complete speech for recognition. The coordinated universal time and/or the timestamp of the speech sub-data block is the time information of the speech included in the speech sub-data block.

According to some embodiments of the present disclosure, when performing step 302, the server extracts audio frames corresponding to each speech, and when performing speech recognition on the audio frames corresponding to each speech, the server obtains a start time point of the speech, for example, a timestamp of the first audio frame of the speech and coordinated universal time when the first audio frame is transcoded. Then, in a process of performing step 303, when the sub-audio stream data is generated according to a speech recognition text of the speech, information about the timestamp and the coordinated universal time is added to the corresponding speech sub-data block.

In some embodiments of the present disclosure, the video stream data blocks in the live video stream data and the audio stream data blocks in the first audio stream data are in a one-to-one correspondence in time. There is also a one-to-one mapping relationship between start time of a complete speech in the first audio stream data and the time information of the audio stream data block. For example, a continuous time period of a complete speech in the first audio stream data may be in a continuous time period corresponding to an audio stream data block, or the continuous time period of the complete speech in the first audio stream data may have an intersection with continuous time periods corresponding to two or more continuous audio stream data blocks. The duration of the speech is calculated by using a timestamp of a corresponding audio frame at which the speech starts as starting time of the complete speech and using a timestamp of a corresponding audio frame at which the speech ends as ending time of the complete speech. In some embodiments of the present disclosure, when generating the second audio stream data including the second speech, the server may generate, for each piece of sub-audio stream data, sub-audio stream data including audio stream data blocks that are in a one-to-one correspondence with the video stream data blocks in the live video stream data. That is, time information of each audio stream data block in the sub-audio stream data is also in a one-to-one correspondence with time information of a corresponding video stream data block in the live video stream data.

Figure 7B:
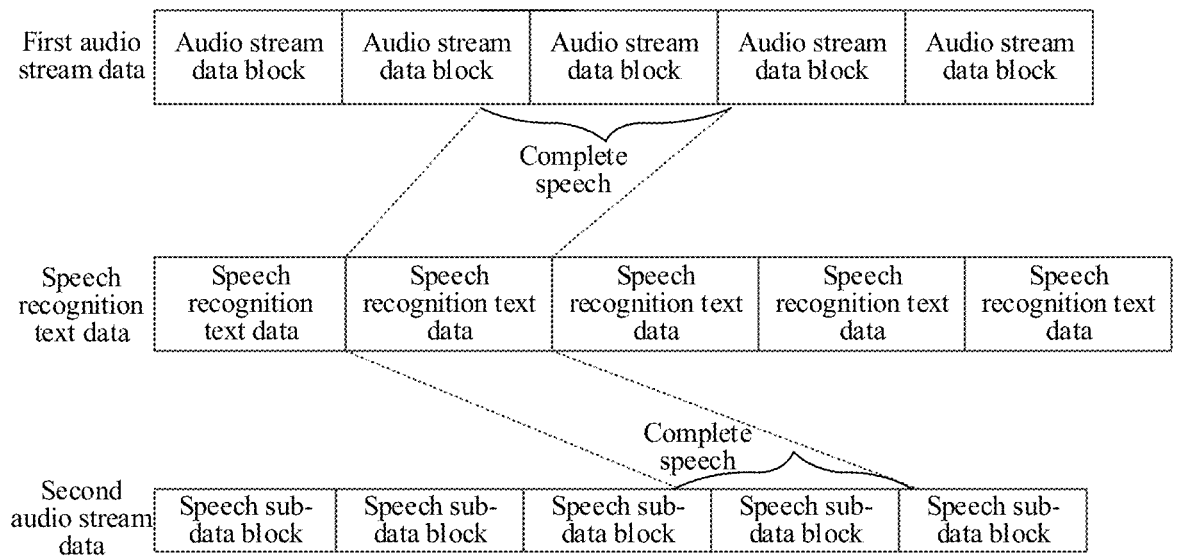
FIG. 7B is a schematic diagram of a video stream processing process according to the embodiment shown in FIG. 3.

FIG. 7B is a schematic diagram of video stream processing according to the embodiment shown in FIG. 3, and shows a correspondence between the first audio stream data, the speech recognition text data, and the second audio stream data.

Step 304: Allocate each of the at least two pieces of sub-audio stream data to a corresponding soundtrack.

In some embodiments of the present disclosure, the server may separately bear each piece of sub-audio stream data by using a corresponding soundtrack. Each soundtrack may independently set its own attribute, for example, a timbre, a volume, and an input/output port.

In a possible implementation, a sound intensity of the second speech is not lower than a sound intensity of the first speech. The sound intensity of the second speech may be implemented by setting a volume attribute of the soundtrack corresponding to each piece of sub-audio stream data.

Step 305: Respectively align the sub-audio stream data in the soundtracks with the live video stream data according to the time information.

In some embodiments of the present disclosure, after caching the live video stream data and delaying a preset duration, or after generating the second audio stream data, for each soundtrack, the server aligns each audio stream data block in sub-audio stream data corresponding to the soundtrack with a video stream data block of corresponding time information in the live video stream data.

Step 306: Merge the sub-audio stream data in the soundtracks and the live video stream data that are aligned, to obtain the processed live video stream data.

In some embodiments of the present disclosure, the server multiplexes the sub-audio stream data in the soundtracks and the live video stream data into a video stream (that is, the live video stream data).

Figure 8:
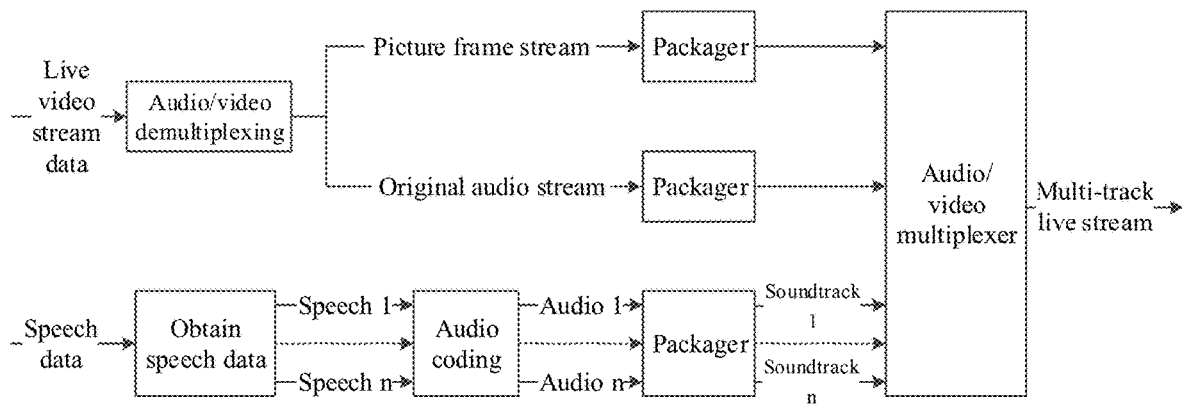
FIG. 8 is a schematic diagram of multiplexing a multi-channel soundtrack and live video stream data according to the embodiment shown in FIG. 3.

For example, FIG. 8 is a schematic diagram of multiplexing a multi-channel soundtrack and live video stream data according to some embodiments of the present disclosure. As shown in FIG. 8, on one hand, the server extracts live video stream data from a local cache, performs audio/video demultiplexing on the extracted live video stream data to obtain a picture frame stream and an original audio stream, and inputs the obtained picture frame stream and original audio stream into an audio/video multiplexer after format encapsulation (for example, adding a protocol header) is separately performed by using a packager; on the other hand, the server obtains speech data (equivalent to the second speech) including a plurality of speeches (speech 1 to speech n shown in FIG. 8, where n is an integer greater than or equal to 2), obtains multi-channel audios (audio 1 to audio n shown in FIG. 8, equivalent to the sub-audio stream data in the second audio stream data) through encoding by using an audio encoder, performs format encapsulation on the multi-channel audios by using a packager, and inputs the multi-channel audios into the audio/video multiplexer after respectively allocating each of the multi-channel audios into a soundtrack (soundtrack 1 to soundtrack n shown in FIG. 8); finally, the server multiplexes the picture frame stream, the original audio stream, and the multi-channel audios respectively carried in the n soundtracks into a multi-track live stream by using the audio/video multiplexer (corresponding to the processed live video stream data).

Step 307: Transmit the processed live video stream data to a user terminal.

In a possible implementation, when playing a live video, a player on a user terminal side may display a translation speech selection interface. The translation speech selection interface includes a language type option corresponding to each soundtrack. When receiving a selection operation performed by a user in the translation speech selection interface for a target language type option, the player plays sub-audio stream data in a soundtrack corresponding to the target language type option.

In some embodiments of the present disclosure, when the player on the user terminal side plays a live video, in addition to playing a live picture and an original live audio, the user may further select to play one of a plurality of translation speeches.

Figure 9:
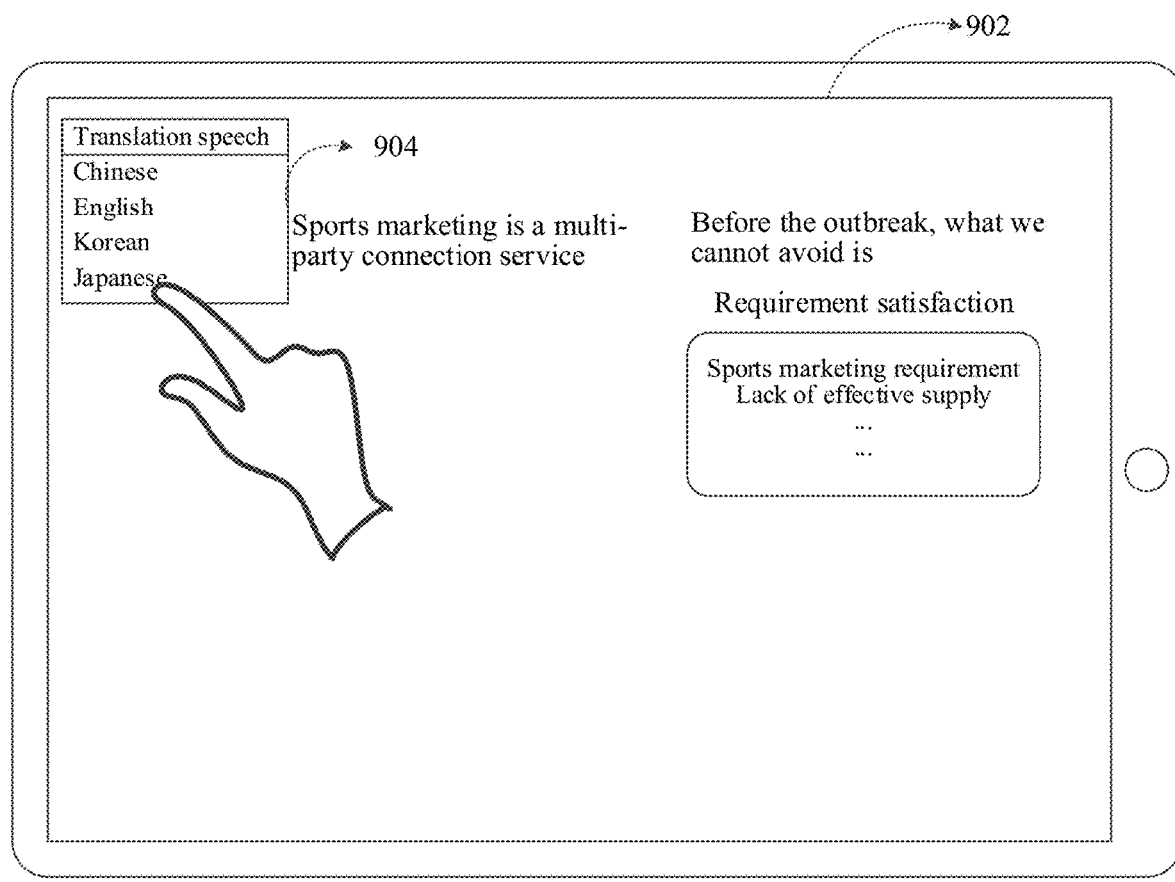
FIG. 9 is a schematic diagram of translation speech selection according to the embodiment shown in FIG. 3.

For example, FIG. 9 is a schematic diagram of translation speech selection according to some embodiments of the present disclosure. As shown in FIG. 9, when a user terminal plays a live picture and an original audio through a live streaming interface 902, a user may call out a translation speech selection menu 904 in a manner such as clicking/tapping, and select a translation speech option corresponding to a language type (as shown in FIG. 9, the user selects a Japanese translation speech). Then, the user terminal synchronously plays the Japanese translation speech on the basis of the original live audio.

In conclusion, in the solution shown in some embodiments of the present disclosure, the server may obtain first audio stream data included in live video stream data, perform speech recognition on the first audio stream data, generate, according to a recognition result, sub-audio stream data respectively corresponding to a plurality of different language types, allocate the sub-audio stream data respectively corresponding to the plurality of different language types to different soundtracks, then align the sub-audio stream data in the plurality of soundtracks with the live video stream data according to time information, and multiplex the sub-audio stream data and the live video stream data that are aligned to the same processed live video stream to be pushed to a user terminal. A user selects sub-audio stream data in a soundtrack to be synchronously played with an original live video stream, thereby implementing accurate synchronization of a translation speech and a video picture. In addition, because there is no need for an interpreter to perform interpretation at a live streaming site, a live streaming delay can be effectively reduced.

Figure 10:
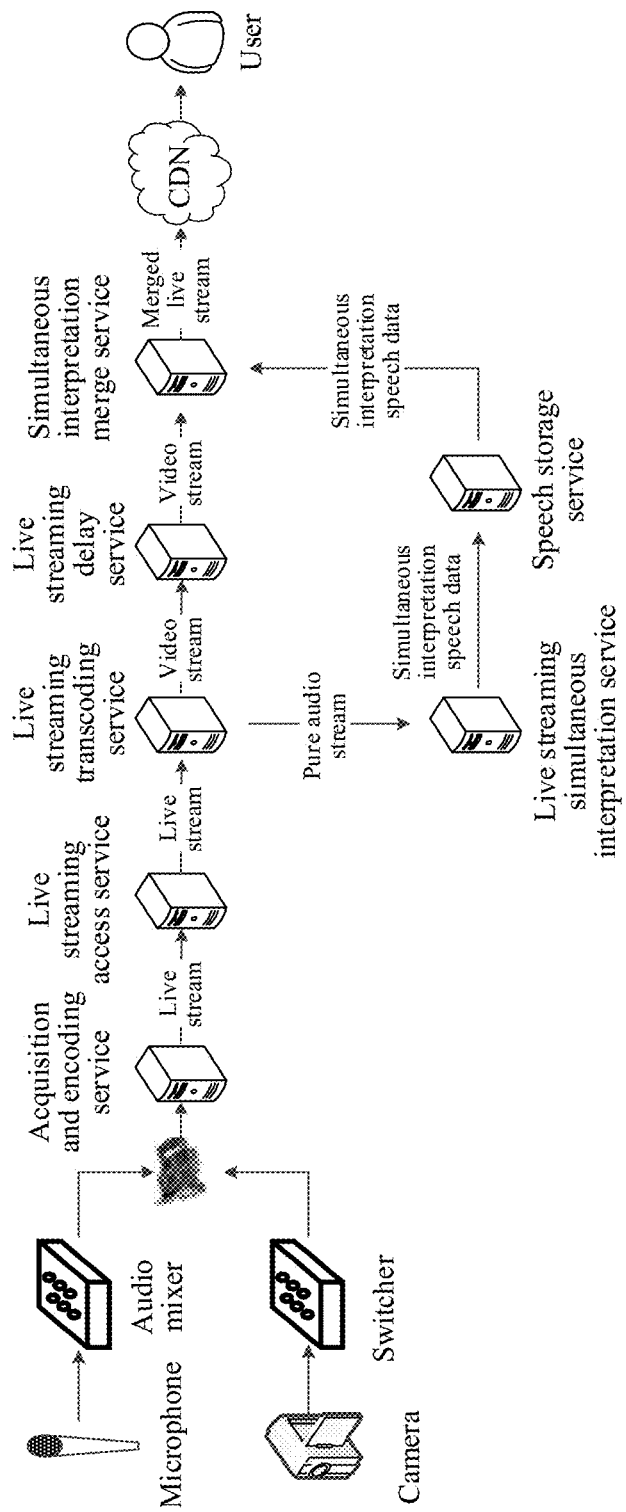
FIG. 10 is a schematic flowchart of processing a live video stream according to an embodiment of the present disclosure.

Based on the foregoing solution shown in FIG. 3, FIG. 10 is a schematic flowchart of processing a live video stream according to an exemplary embodiment. As shown in FIG. 10, after acquiring and encoding a live streaming picture and sound acquired by a camera (picture switcher) and a microphone (audio mixer) by using a capture card, a live recording terminal uploads a live stream to a server by using a live streaming access service. The server transcodes the accessed live stream by using a live streaming transcoding service, and outputs a video stream (including picture frame data blocks and audio stream data blocks) and a pure audio stream (including only audio stream data blocks). The video stream and the pure audio stream mark synchronous content blocks by using the same time information (UTC/timestamp). After the transcoding, on one hand, the server implements delayed output (for example, delaying a preset duration) of the video stream by using a live streaming delay service; on the other hand, the server performs speech recognition, translation, and speech conversion on audio data (that is, the pure audio stream) by using a live streaming simultaneous interpretation service, to obtain simultaneous interpretation speech data corresponding to different language types (corresponding to the second audio stream data), and writes the simultaneous interpretation speech data to a speech storage service. The speech storage service stores the simultaneous interpretation speech data. When the preset duration of delay is reached, the server pulls video data (that is, the video stream) from the live streaming delay service by using the simultaneous interpretation merge service, pulls the simultaneous interpretation speech data of corresponding time information from the speech storage service, synchronously merges the video stream and the simultaneous interpretation speech data into a merged live stream (corresponding to the processed live video stream data) according to the time information (for example, a timestamp), and transmits the merged live stream to the user terminal for playing by using a content delivery network (CDN). In the merged live stream, a simultaneous interpretation speech corresponding to each language type is stored in an independent soundtrack, and the simultaneous interpretation merge service outputs a multi-track merged stream including different language types. When the merged stream is played, a user may select, according to a requirement, a different translation speech to be synchronously played with the original live video stream.

FIG. 10 provides a solution of real-time recognition, translation, and translation speech synchronous merging based on the live stream. A live streaming background (that is, the server) extracts an audio stream from a live stream in real time, recognizes an audio signal in the live stream in real time by using an artificial intelligence algorithm, synchronously translates and converses the audio signal into a plurality of target speeches, and then synchronously merges audio data including the plurality of target speeches with original video content, to generate a live stream including a plurality of soundtracks. During playing, a user may select, according to a requirement, a corresponding soundtrack for playing, thereby achieving an objective of simultaneous interpretation. Live streaming simultaneous interpretation is performed at the live streaming background, and it is not limited by a site, and can be implemented by only accessing the live stream to the live streaming background. The live streaming simultaneous interpretation solution is implemented by automatic learning and processing of a machine, and no manual processing is required. Without participation of an interpreter, the solution is not affected by a human factor. The simultaneous interpretation speech and the original video picture are completely synchronized by using UTC/timestamp information, and there is no delay of the simultaneous interpretation speech to the picture content. In addition, the foregoing solution supports simultaneous interpretation processing and outputting of a plurality of speeches at the same time, and the speeches are merged into the original video stream, to implement one live stream in a multi-track manner. A function of supporting a plurality of language type selections is provided, so that outputting and processing of speeches of a plurality of language types are supported, and not each simultaneous interpretation stream needs to be individually provided.

Therefore, the foregoing solution resolves a related problem caused by a human factor in a conventional simultaneous interpretation solution, and can support simultaneous processing and outputting of a plurality of language types, which has a wider range of application scenario. At the same time, speech data after the simultaneous interpretation is merged with the original stream in a multi-track manner into one live stream for delivery, which reduces costs of data delivery.

In another possible implementation, the server may alternatively merge the second audio stream data and an original audio (that is, the first audio stream data) in the live video stream into one audio stream.

Figure 11:
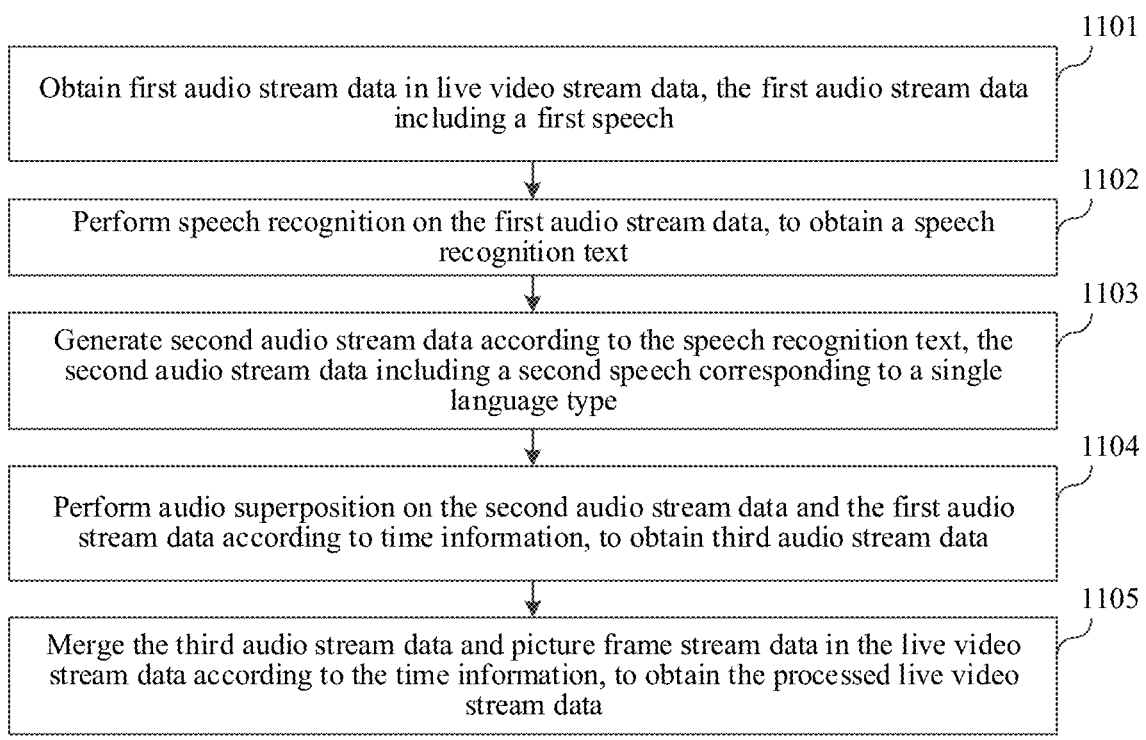
FIG. 11 is a flowchart of a video stream processing method according to still another embodiment of the present disclosure.

FIG. 11 is a flowchart of a video stream processing method according to an exemplary embodiment. The video stream processing method may be applied to a server, for example, the method may be performed by the server 140 shown in FIG. 1. As shown in FIG. 11, the video stream processing method may include the following steps:

Step 1101: Obtain first audio stream data in live video stream data, the first audio stream data including a first speech.

Step 1102: Perform speech recognition on the first audio stream data, to obtain a speech recognition text.

Step 1103: Generate second audio stream data according to the speech recognition text, the second audio stream data including a second speech corresponding to a single language type.

The language type corresponding to the second speech is different from a language type corresponding to the first speech.

Different from the embodiment shown in FIG. 3, in some embodiments of the present disclosure, the second audio stream data may only include a speech corresponding to one language type.

A generation manner of the second audio stream data is similar to the manner of generating the sub-audio stream data in the embodiment shown in FIG. 3, and details are not described herein again.

Step 1104: Perform audio superposition on the second audio stream data and the first audio stream data according to time information, to obtain third audio stream data.

In some embodiments of the present disclosure, after caching the live video stream data and delaying a preset duration, or after successfully storing the second audio stream data, for the second audio stream data, the server aligns each audio stream data block in the second audio stream data with an audio stream data block of corresponding time information in the first audio stream data, and performs audio superposition on the aligned audio stream data blocks, to obtain the third audio stream data formed by the superposed audio stream data blocks.

In some embodiments of the present disclosure, the audio superposition refers to superposing two audios having the same time information into one audio of corresponding time information. For example, if an audio 1 and an audio 2 with the same time information have a playing duration of 1 minute, the audio 1 and the audio 2 are superposed to obtain an audio 3, and therefore, a playing duration of the audio 3 is also 1 minute, and the audio 3 includes both audio content of the audio 1 and the audio 2.

Step 1105: Merge the third audio stream data and picture frame stream data in the live video stream data according to the time information, to obtain the processed live video stream data.

In some embodiments of the present disclosure, after obtaining the live video stream data through transcoding, the server may demultiplex the live video stream into the first audio stream data and the picture frame stream data, and cache the picture frame stream data locally.

The picture frame stream data may be formed by a series of picture frame stream data blocks. The picture frame data blocks in the picture frame stream data and the audio stream data blocks in the first audio stream data are in a one-to-one correspondence in time. In addition, a composition of each picture frame stream data block is similar to that of the video stream data block or the audio stream data block. That is, a picture frame stream data block includes two parts: a header and a payload. The payload may include picture frames in the picture frame stream data block. The header includes information such as a header size, a payload size, a duration, an index, coordinated universal time, and a timestamp.

Time information of each audio stream data block included in the third audio stream data obtained after the superposition is in a one-to-one correspondence with time information of each audio stream data block included in the first audio stream data. Therefore, the server may align the third audio stream data and the picture frame stream data in the live video stream data according to the time information, and merge the third audio stream data and the picture frame stream data in the live video stream data that are aligned, to obtain the processed live video stream data.

In some embodiments of the present disclosure, when receiving a live video obtaining request transmitted by a user terminal, the server may push the processed live video stream data to the user terminal for playing. For example, the server may receive a video stream obtaining request transmitted by the user terminal; obtain language type indication information carried in the video stream obtaining request, the language type indication information being used for indicating an audio language type; and push the processed live video stream data to the user terminal in a case that an audio language type indicated by the language type indication information is the language type corresponding to the second speech.

A user watching a live video may request to obtain a live video stream including a translation speech of a specified language type on a user terminal side. For example, a user may select a translation speech of a language type in a translation speech selection interface on the user terminal side. Then, the user terminal transmits a video stream obtaining request to the server, the video stream obtaining request including language type indication information indicating a translation language type selected by the user. After receiving the video stream obtaining request transmitted by the user terminal, the server may obtain the language type indication information.

For the processed live video stream data obtained in step 1105, when the translation language type indicated by the language type indication information in the video stream obtaining request transmitted by the user terminal is a language type corresponding to a translation speech included in the processed live video stream data obtained in step 1105, the server may push the processed live video stream data to the user terminal for playing.

In some embodiments of the present disclosure, the server may generate, for each language type, a corresponding live video stream including a translation speech. When the user terminal side selects a language type, the server may transmit a live video stream including a translation speech of the language type to the user terminal.

In a possible implementation, the user may select a live video stream corresponding to a translation language type when entering a live streaming interface. For example, when a user opens a live channel, the user terminal displays a live video stream selection interface including several live streaming entries, and each live streaming entry corresponds to a translation speech of a language type. After the user clicks/taps one of the live streaming entries (for example, a live streaming entry corresponding to a Chinese translation speech), the user terminal displays a live streaming interface, and transmits a video stream obtaining request to the server at the same time. The video stream obtaining request indicates that the user selects the Chinese translation speech, and the server pushes a live video stream corresponding to the Chinese translation speech to the user terminal, for the user terminal to play in the live streaming interface.

Alternatively, in another possible implementation, the user may also select, in a process of watching a live video, to switch to another live video stream including a different translation speech. The live video stream switching interface is similar to the interface shown in FIG. 9, and details are not described herein again.

In conclusion, in the solution shown in some embodiments of the present disclosure, the server may obtain first audio stream data included in live video stream data, perform speech recognition on the first audio stream data, generate, according to a recognition result, second audio stream data corresponding to another language type, merge the audio stream data obtained after superposing the second audio stream data and the first audio stream data with picture frame stream data in the live video stream data, and push the processed live video stream data obtained after the merging to a user terminal for playing, thereby implementing accurate synchronization of a translation speech and a video picture. In addition, because there is no need for an interpreter to perform interpretation at a live streaming site, a live streaming delay can be effectively reduced.

Figure 12:
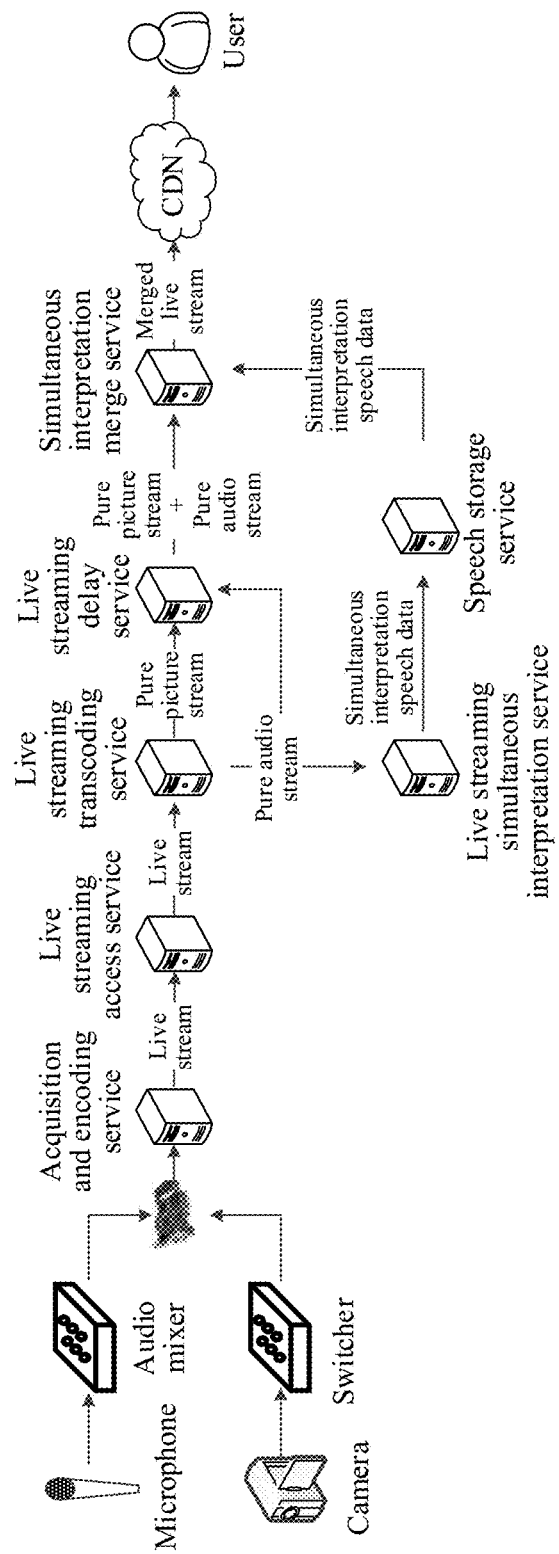
FIG. 12 is a schematic flowchart of processing a live video stream according to another embodiment of the present disclosure.

Based on the foregoing solution shown in FIG. 11, FIG. 12 is a schematic flowchart of processing a live video stream according to an exemplary embodiment. As shown in FIG. 12, after acquiring and encoding a live streaming picture and sound acquired by a camera (picture switcher) and a microphone (audio mixer) by using a capture card, a live recording terminal uploads a live stream to a server by using a live streaming access service. The server transcodes the accessed live stream by using a live streaming transcoding service, and outputs a pure picture stream (only including picture frame data blocks) and a pure audio stream (only including audio stream data blocks). After the transcoding, on one hand, the server implements delayed output (for example, delaying a preset duration) of the pure picture stream by using a live streaming delay service; on the other hand, the server splits the pure audio stream into two paths, implements delayed output of the pure audio stream by using the live streaming delay service for one path, inputs the other path into a live streaming simultaneous interpretation service for speech recognition, translation, and speech conversion, to obtain simultaneous interpretation speech data corresponding to different language types (corresponding to the second audio stream data), and writes the simultaneous interpretation speech data to a speech storage service. The speech storage service stores the simultaneous interpretation speech data. When the preset duration of delay is reached, the server pulls the pure picture stream and the pure audio stream from the live streaming delay service by using the simultaneous interpretation merge service, pulls the simultaneous interpretation speech data of corresponding time information from the speech storage service, superposes the pure audio stream and the simultaneous interpretation speech data to obtain a merged audio stream, synchronously merges the merged audio stream and the pure picture stream into a merged live stream (corresponding to the processed live video stream data) according to the time information (for example, a timestamp), and transmits the merged live stream to the user terminal for playing by using a CDN.

Figure 13:
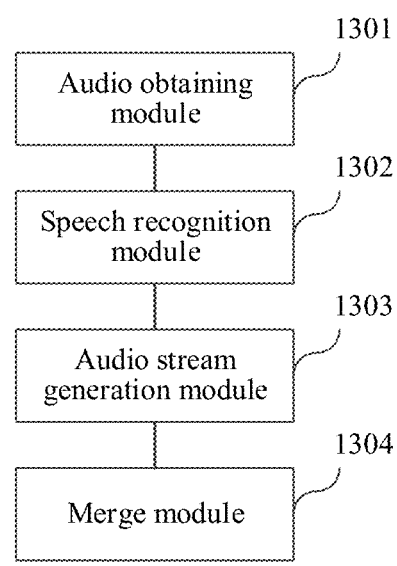
FIG. 13 is a structural block diagram of a video stream processing apparatus in a live streaming scenario according to an embodiment of the present disclosure.

FIG. 13 is a structural block diagram of a video stream processing apparatus according to an exemplary embodiment. The video stream processing apparatus may be applied to the system shown in FIG. 1, to perform all or some steps of the method provided in the embodiment shown in FIG. 2, FIG. 3, or FIG. 11. The video stream processing apparatus may include:

an audio obtaining module 1301, configured to obtain first audio stream data in live video stream data, the first audio stream data including a first speech;

a speech recognition module 1302, configured to perform speech recognition on the first audio stream data, to obtain a speech recognition text;

an audio stream generation module 1303, configured to generate second audio stream data according to the speech recognition text, the second audio stream data including a second speech, and a language type corresponding to the second speech being different from a language type corresponding to the first speech; and a merge module 1304, configured to merge the second audio stream data and the live video stream data according to time information, to obtain processed live video stream data, the time information being used for indicating a playing timestamp of audio stream data or live video stream data.

The apparatus may further include a soundtrack allocation module, configured to allocate, before the merge module merges the second audio stream data and the live video stream data according to time information, to obtain processed live video stream data, the second audio stream data to a target soundtrack, the target soundtrack being different from a soundtrack in which the first audio stream data is located.

The second audio stream data may include at least two pieces of sub-audio stream data, and each piece of the sub-audio stream data includes a speech corresponding to a language type.

The soundtrack allocation module is specifically configured to allocate each of the at least two pieces of sub-audio stream data to a corresponding soundtrack.

The merge module 1304 may be specifically configured to:

respectively align the sub-audio stream data in the soundtracks with the picture frame stream data according to the time information; and merge the sub-audio stream data in the soundtracks and the live video stream data that are aligned, to obtain the processed live video stream data.

The merge module 1304 may be specifically configured to:

perform audio superposition on the second audio stream data and the first audio stream data according to the time information, to obtain third audio stream data; and merge the third audio stream data and the picture frame stream data in the live video stream data according to the time information, to obtain the processed live video stream data.

The apparatus may further include:

a request receiving module, configured to receive a video stream obtaining request transmitted by a user terminal;

an indication information obtaining module, configured to obtain language type indication information carried in the video stream obtaining request, the language type indication information being used for indicating an audio language type; and a push module, configured to push the processed live video stream data to the user terminal in a case that an audio language type indicated by the language type indication information is the language type corresponding to the second speech.

The merge module 1304 may be specifically configured to:

merge, after delaying a preset duration from a first moment, the second audio stream data and the live video stream data according to the time information, to obtain the processed live video stream data, the first moment being a moment at which the live video stream data is obtained.

The merge module 1304 may be specifically configured to:

merge, after the second audio stream data is successfully stored, the second audio stream data and the live video stream data according to the time information, to obtain the processed live video stream data.

The speech recognition module 1302 may be specifically configured to:

perform speech start and end detection on the first audio stream data, to obtain a speech start frame and a speech end frame in the first audio stream data, the speech start frame being an audio frame at which a speech starts, and the speech end frame being an audio frame at which a speech ends;

extract at least one piece of speech data from the first audio stream data according to the speech start frame and the speech end frame in the first audio stream data, the speech data comprising audio frames between a corresponding pair of speech start frame and speech end frame;

perform speech recognition on each of the at least one piece of speech data, to obtain a recognition sub-text corresponding to each of the at least one piece of speech data; and obtain the recognition sub-text corresponding to each of the at least one piece of speech data as the speech recognition text.

The audio stream generation module 1303 may be specifically configured to:

translate the speech recognition text into a translation text of the language type corresponding to the second speech;

generate the second speech according to the translation text; and generate the second audio stream data comprising the second speech.

A sound intensity of the second speech is, for example, not lower than a sound intensity of the first speech.

Figure 14:
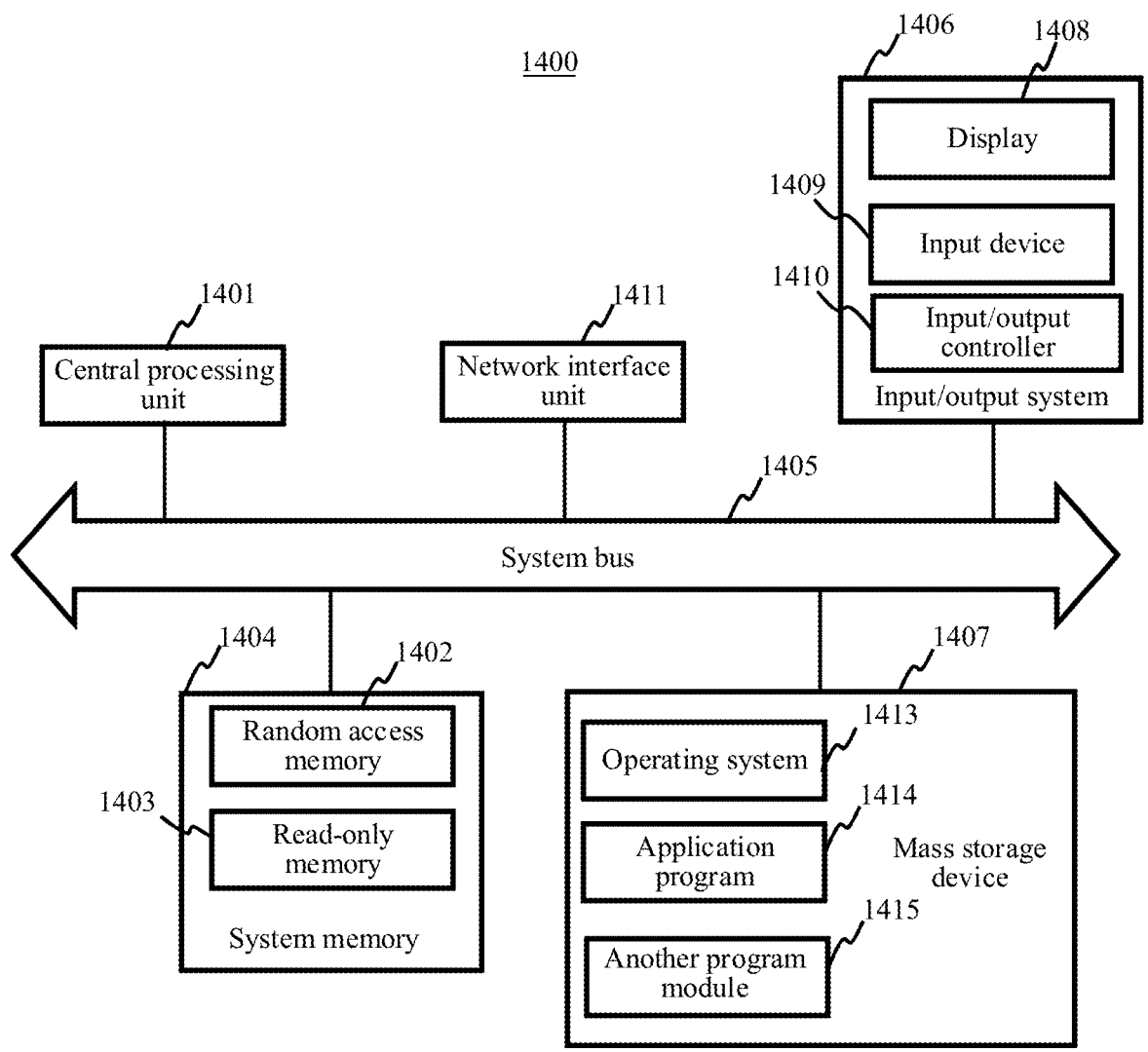
FIG. 14 is a structural block diagram of a computer device according to an embodiment of the present disclosure.

FIG. 14 is a structural block diagram of a computer device 1400 according to an exemplary embodiment of the present disclosure. The computer device 1400 includes a central processing unit (CPU) 1401, a system memory 1404 including a random access memory (RAM) 1402 and a read-only memory (ROM) 1403, and a system bus 1405 connecting the system memory 1404 and the CPU 1401. The computer device 1400 further includes a basic input/output system (I/O system) 1406 configured to transmit information between components in a computer, and a mass storage device 1407 configured to store an operating system 1413, an application program 1414, and another program module 1415.

The basic I/O system 1406 includes a display 1408 configured to display information, and an input device 1409, such as a mouse or a keyboard, used by a user to input information. The display 1408 and the input device 1409 are both connected to the CPU 1401 by using an input/output controller 1410 connected to the system bus 1405. The basic I/O system 1406 may further include the input/output controller 1410, to receive and process inputs from multiple other devices, such as the keyboard, the mouse, or an electronic stylus. Similarly, the input/output controller 1410 further provides an output to a display screen, a printer or another type of output device.

The mass storage device 1407 is connected to the CPU 1401 by using a mass storage controller (not shown) connected to the system bus 1405. The mass storage device 1407 and an associated computer-readable medium provide non-volatile storage for the computer device 1400. That is, the mass storage device 1407 may include a computer-readable medium (not shown), such as a hard disk or a CD-ROM drive.

Without loss of generality, the computer-readable medium may include a computer storage medium and a communication medium. The computer storage medium includes volatile and non-volatile media, and removable and non-removable media implemented by using any method or technology used for storing information such as a computer-readable instruction, a data structure, a program module, or other data. The computer storage medium includes a RAM, a ROM, an EPROM, an EEPROM, a flash memory, or another solid storage technology; a CD-ROM, a DVD, or another optical storage; and a cassette, a magnetic tape, a disk storage, or another magnetic storage device. Certainly, the computer storage medium is not limited to the foregoing types. The system memory 1404 and the mass storage device 1407 may be collectively referred to as a memory.

The computer device 1400 may be connected to the Internet or another network device by using a network interface unit 1411 connected to the system bus 1405.

The memory further includes one or more programs. The one or more programs are stored in the memory. The CPU 1401 executes the one or more programs to implement all or some steps in the method shown in any one of FIG. 2, FIG. 3, or FIG. 11.

In an exemplary embodiment, a non-transitory computer-readable storage medium including an instruction, for example, a memory including a computer program (instruction), is further provided. The program (instruction) may be executed by a processor of a computer device to implement the video stream processing method in the embodiments of the present disclosure. For example, the non-transitory computer-readable storage medium may be a ROM, a RAM, a CD-ROM, a magnetic tape, a floppy disk, an optical data storage device, or the like.

After considering the specification and practicing the present disclosure, a person skilled in the art would easily conceive of other implementations of the present disclosure. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure. The specification and the embodiments are considered as merely exemplary, and the real scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A video stream processing method, performed by a computer device, comprising:

performing an audio/video demultiplexing on live stream data to obtain a picture frame stream and the first audio stream, the first audio stream data comprising a first speech;

performing speech recognition on the first audio stream data, to obtain a speech recognition text;

generating second audio stream data according to the speech recognition text, the second audio stream data comprising a second speech, and a language of the second speech being different from a language of the first speech; and merging the second audio stream data and the live video stream data according to time information, to obtain processed live video stream data, the time information indicating a playing timestamp of the second audio stream data and the live video stream data, including:

multiplexing, by an audio/video multiplexer, the picture frame stream, the first audio stream, and the second audio stream that are separately processed with format encapsulation to obtain the processed live video stream data having multiple soundtracks, each of the multiple soundtracks corresponding to a different language.

2. The method according to claim 1, wherein before the merging the second audio stream data and the live video stream data according to time information, to obtain processed live video stream data, the method further comprises:

allocating the second audio stream data to a target soundtrack of the processed live video stream data, the target soundtrack being different from a soundtrack in which the first audio stream data is located.

3. The method according to claim 2, wherein the second audio stream data comprises at least two pieces of sub-audio stream data, and each piece of the sub-audio stream data comprises a speech of a different language;

the allocating the second audio stream data to a target soundtrack comprises:

allocating each of the at least two pieces of sub-audio stream data to a corresponding soundtrack; and the merging the second audio stream data and the live video stream data according to time information, to obtain processed live video stream data comprises:

respectively aligning each of the at least two pieces of sub-audio stream data in the soundtracks with the live video stream data according to the time information; and merging the aligned sub-audio stream data in the soundtracks and the live video stream data, to obtain the processed live video stream data, including:

inputting the at least two pieces of sub-audio stream data to the audio/video multiplexer after the format encapsulation are performed on the at least two pieces of sub-audio stream data by using a packager.

4. The method according to claim 1, wherein the merging the second audio stream data and the live video stream data according to time information, to obtain processed live video stream data comprises:

performing audio superposition on the second audio stream data and the first audio stream data according to the time information, to obtain third audio stream data; and merging the third audio stream data and picture frame stream data in the live video stream data according to the time information, to obtain the processed live video stream data.

5. The method according to claim 4, further comprising:

receiving a video stream obtaining request transmitted by a user terminal;

obtaining language type indication information carried in the video stream obtaining request, the language type indication information indicating an audio language type; and pushing the processed live video stream data to the user terminal when the audio language type indicated by the language type indication information is the language corresponding to the second speech.

6. The method according to claim 1, further comprising:

merging, after delaying a preset duration from a first moment, the second audio stream data and the live video stream data according to the time information, to obtain the processed live video stream data, the first moment being a moment at which the live video stream data is obtained.

7. The method according to claim 1, further comprising:

merging, after the second audio stream data is successfully stored, the second audio stream data and the live video stream data according to the time information, to obtain the processed live video stream data.

8. The method according to claim 1, wherein the performing speech recognition on the first audio stream data, to obtain a speech recognition text comprises:

performing speech start and end detection on the first audio stream data, to obtain a speech start frame and a speech end frame in the first audio stream data, the speech start frame being an audio frame at which a speech starts, and the speech end frame being an audio frame at which a speech ends;

extracting at least one piece of speech data from the first audio stream data according to the speech start frame and the speech end frame in the first audio stream data, a piece of speech data comprising audio frames between a corresponding pair of speech start frame and speech end frame;

performing speech recognition on each of the at least one piece of speech data, to obtain a recognition sub-text corresponding to each of the at least one piece of speech data; and obtaining the recognition sub-text corresponding to each of the at least one piece of speech data as the speech recognition text.

9. The method according to claim 1, wherein the generating second audio stream data according to the speech recognition text comprises:

translating the speech recognition text into a translation text of the language of the second speech;

generating the second speech according to the translation text; and generating the second audio stream data comprising the second speech.

10. The method according to claim 1, wherein a sound intensity of the second speech is not lower than a sound intensity of the first speech.

11. The method according to claim 1, wherein:

a header of a picture frame stream block of the picture frame stream, a header of an audio stream data block of the first audio stream data, and a header of an audio stream data block of the second audio stream data each include: a duration, coordinated universal time (UTC), and the playing timestamp.

12. A computer device, comprising a processor and a memory coupled to the processor, the processor being configured to perform:

performing an audio/video demultiplexing on live stream data to obtain a picture frame stream and the first audio stream, the first audio stream data comprising a first speech;
performing speech recognition on the first audio stream data, to obtain a speech recognition text;
generating second audio stream data according to the speech recognition text, the second audio stream data comprising a second speech, and a language of the second speech being different from a language of the first speech; and
merging the second audio stream data and the live video stream data according to time information, to obtain processed live video stream data, the time information indicating a playing timestamp of the second audio stream data and the live video stream data, including:
multiplexing, by an audio/video multiplexer, the picture frame stream, the first audio stream, and the second audio stream that are separately processed with format encapsulation to obtain the processed live video stream data having multiple soundtracks, each of the multiple soundtracks corresponding to a different language.

13. The computer device according to claim 12, wherein before the merging the second audio stream data and the live video stream data according to time information, to obtain processed live video stream data, the processor is further configured to perform:
allocating the second audio stream data to a target soundtrack of the processed live video stream data, the target soundtrack being different from a soundtrack in which the first audio stream data is located.

14. The computer device according to claim 13, wherein the second audio stream data comprises at least two pieces of sub-audio stream data, and each piece of the sub-audio stream data comprises a speech of a different language;
the allocating the second audio stream data to a target soundtrack comprises:
allocating each of the at least two pieces of sub-audio stream data to a corresponding soundtrack; and
the merging the second audio stream data and the live video stream data according to time information, to obtain processed live video stream data comprises:
respectively aligning each of the at least two pieces of sub-audio stream data in the soundtracks with the live video stream data according to the time information; and
merging the aligned sub-audio stream data in the soundtracks and the live video stream data, to obtain the processed live video stream data, including:
inputting the at least two pieces of sub-audio stream data to the audio/video multiplexer after the format encapsulation are performed on the at least two pieces of sub-audio stream data by using a packager.

15. The computer device according to claim 12, wherein the merging the second audio stream data and the live video stream data according to time information, to obtain processed live video stream data comprises:
performing audio superposition on the second audio stream data and the first audio stream data according to the time information, to obtain third audio stream data; and
merging the third audio stream data and picture frame stream data in the live video stream data according to the time information, to obtain the processed live video stream data.

16. The computer device according to claim 15, wherein the processor is further configured to perform:
receiving a video stream obtaining request transmitted by a user terminal;
obtaining language type indication information carried in the video stream obtaining request, the language type indication information indicating an audio language type; and
pushing the processed live video stream data to the user terminal when the audio language type indicated by the language type indication information is the language corresponding to the second speech.

17. The computer device according to claim 12, wherein the processor is further configured to perform:
merging, after delaying a preset duration from a first moment or after the second audio stream data is successfully stored, the second audio stream data and the live video stream data according to the time information, to obtain the processed live video stream data,
the first moment being a moment at which the live video stream data is obtained.

18. The computer device according to claim 12, wherein the performing speech recognition on the first audio stream data, to obtain a speech recognition text comprises:
performing speech start and end detection on the first audio stream data, to obtain a speech start frame and a speech end frame in the first audio stream data, the speech start frame being an audio frame at which a speech starts, and the speech end frame being an audio frame at which a speech ends;
extracting at least one piece of speech data from the first audio stream data according to the speech start frame and the speech end frame in the first audio stream data, a piece of speech data comprising audio frames between a corresponding pair of speech start frame and speech end frame;
performing speech recognition on each of the at least one piece of speech data, to obtain a recognition sub-text corresponding to each of the at least one piece of speech data; and
obtaining the recognition sub-text corresponding to each of the at least one piece of speech data as the speech recognition text.

19. A non-transitory computer-readable storage medium, storing at least one instruction, at least one program, and a code set or an instruction set, the at least one instruction, the at least one program, and the code set or the instruction set being loaded and executed by a processor to perform:
performing an audio/video demultiplexing on live stream data to obtain a picture frame stream and the first audio stream, the first audio stream data comprising a first speech;
performing speech recognition on the first audio stream data, to obtain a speech recognition text;
generating second audio stream data according to the speech recognition text, the second audio stream data comprising a second speech, and a language of the second speech being different from a language of the first speech; and
merging the second audio stream data and the live video stream data according to time information, to obtain processed live video stream data, the time information indicating a playing timestamp of the second audio stream data and the live video stream data, including:
multiplexing, by an audio/video multiplexer, the picture frame stream, the first audio stream, and the second audio stream that are separately processed with format encapsulation to obtain the processed live video stream data having multiple soundtracks, each of the multiple soundtracks corresponding to a different language.

* * * * *